(12) United States Patent
Hirai (10) Patent No.: US 7,269,466 B2
(45) Date of Patent: Sep. 11, 2007

(54) OPTIMAL OPERATION CONTROLLER OF PLANT

(75) Inventor: Norio Hirai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 233 days.

(21) Appl. No.: 10/614,129

(22) Filed: Jul. 8, 2003

(65) Prior Publication Data

US 2004/0019392 A1   Jan. 29, 2004

(30) Foreign Application Priority Data

Jul. 24, 2002   (JP) ............................. 2002-214665

(51) Int. Cl.
*G05B 13/02* (2006.01)
*F02B 47/08* (2006.01)
*F02D 47/00* (2006.01)

(52) U.S. Cl. .................. 700/28; 700/29; 123/568.22; 123/674

(58) Field of Classification Search ............ 700/28–29; 340/511; 60/660; 250/339.12; 73/863.12; 123/568, 674, 568.22

See application file for complete search history.

(56) References Cited

U.S. PATENT DOCUMENTS

| | | | | |
|---|---|---|---|---|
| 4,173,205 A | * | 11/1979 | Toelle | .................. 123/568.22 |
| 5,668,373 A | * | 9/1997 | Robbat et al. | ......... 250/339.12 |
| 5,873,251 A | * | 2/1999 | Iino | ............................ 60/660 |
| 5,970,804 A | * | 10/1999 | Robbat, Jr. | ............... 73/863.12 |
| 5,983,875 A | * | 11/1999 | Kitagawa et al. | ........... 123/674 |
| 6,125,831 A | * | 10/2000 | Yasui et al. | .................. 123/674 |
| 6,265,707 B1 | * | 7/2001 | Hait | ........................... 250/216 |
| 2004/0204775 A1 | * | 10/2004 | Keyes et al. | ................... 700/29 |
| 2005/0007249 A1 | * | 1/2005 | Eryurek et al. | ............. 340/511 |

FOREIGN PATENT DOCUMENTS

| | | |
|---|---|---|
| JP | 57-197606 A | 3/1982 |
| JP | 05-100712 A | 4/1993 |
| JP | 2000-078749 | 3/2000 |
| JP | 2000-078750 A | 3/2000 |
| JP | 2002-182739 A | 6/2002 |
| WO | WO-01/08054 A2 | 2/2001 |

\* cited by examiner

*Primary Examiner*—Anthony Knight
*Assistant Examiner*—Sunray Chang
(74) *Attorney, Agent, or Firm*—Birch, Stewart, Kolasch & Birch, LLP (57) ABSTRACT

The present invention aims to control elements to improve operation efficiency of a plant based on a correlation value of the past accumulated data. According to the invention, an optimal operation controller obtains a correlation between a state of a predetermined process and each element based on an operation status of the plant to be controlled, storing the correlation in a correlation table, and compute an operation efficiency for each element based on the operation status of the plant. Also, the operation controller has a categorization efficiency table for storing the computed operation efficiency of the predetermined process. The operation controller refers to the categorization efficiency table based on a data input from the plant, and outputs an instruction to control the each element accordingly.

18 Claims, 9 Drawing Sheets

| COOLING WATER TEMPERATURE | DEVICE EFFICIENCY (41) |
|---|---|
| 8℃ | 0.978677579 |
| | 0.976739177 |
| | 0.976308421 |
| | 0.975662287 |
| | 0.974585397 |
| | 0.974585397 |
| | 0.974370019 |
| | 0.973508507 |
| | 0.973508507 |
| | 0.973293129 |
| | 0.973077751 |
| | 0.973077751 |
| | 0.973077751 |
| | 0.971785484 |
| | 0.971570106 |
| 9℃ | 0.983631273 |
| | 0.982769761 |
| | 0.982769761 |
| | 0.982554383 |
| | 0.981477493 |
| | 0.981262115 |
| ⋮ | ⋮ |
| 30℃ | 0.966401034 |
| | 0.96467801 |
| | 0.964247254 |
| | 0.96360112 |
| | 0.96360112 |
| | 0.963385742 |
| | 0.96252423 |
| | 0.959724316 |
| | 0.957785914 |
| | 0.95606289 |
| | 0.95606289 |
| | 0.954770622 |
| | 0.954339866 |
| | 0.952186087 |
| | 0.951109197 |
| | 0.950032307 |
| 31℃ | 0.954986 |

| COOLING WATER TEMPERATURE | DEVICE EFFICIENCY (42) |
|---|---|
| 8℃ | 0.978677579 |
| | 0.976739177 |
| | 0.976308421 |
| | 0.975662287 |
| | 0.974585397 |
| | 0.974585397 |
| | 0.974370019 |
| | 0.973508507 |
| | 0.973508507 |
| | 0.973293129 |
| 9℃ | 0.983631273 |
| | 0.982769761 |
| | 0.982769761 |
| | 0.982554383 |
| | 0.981477493 |
| | 0.981262115 |
| ⋮ | ⋮ |
| 30℃ | 0.966401034 |
| | 0.96467801 |
| | 0.964247254 |
| | 0.96360112 |
| | 0.96360112 |
| | 0.963385742 |
| | 0.96252423 |
| | 0.959724316 |
| | 0.957785914 |
| | 0.95606289 |
| 31℃ | 0.954986 |

| COOLING WATER TEMPERATURE | DEVICE EFFICIENCY | PLANT EFFICIENCY | COOLING WATER TEMPERATURE | DEVICE EFFICIENCY | PLANT EFFICIENCY |
|---|---|---|---|---|---|
| 8℃ | 0.976739177<br>0.974585397<br>0.976308421<br>0.974370019<br>0.973508507<br>0.978677579<br>0.975662287<br>0.973293129<br>0.973508507<br>0.974585397 | 0.992450073<br>0.985387238<br>0.979542133<br>0.979055041<br>0.978324403<br>0.977106673<br>0.976376035<br>0.973697029<br>0.970043838<br>0.9693132 | 8℃ | 0.976739177<br>0.974585397<br>0.976308421 | 0.992450073<br>0.985387238<br>0.979542133 |
| 9℃ | 0.981262115<br>0.982554383<br>0.982769761<br>0.983631273<br>0.982769761<br>0.981477493 | 0.980272772<br>0.979298587<br>0.976132489<br>0.967121286<br>0.960545543<br>0.87481734 | 9℃ | 0.981262115<br>0.982554383<br>0.982769761 | 0.980272772<br>0.979298587<br>0.976132489 |
| ⋮ | ⋮ | ⋮ | ⋮ | ⋮ | ⋮ |
| 30℃ | 0.964247254<br>0.954770622<br>0.951109197<br>0.95606289<br>0.952186087<br>0.968554814<br>0.96360112<br>0.96467801<br>0.959724316<br>0.95606289<br>0.963385742<br>0.957785914<br>0.96252423<br>0.954339866<br>0.96360112<br>0.950032307<br>0.966401034 | 1.006088651<br>0.997808086<br>0.990014613<br>0.987335606<br>0.985143692<br>0.970287384<br>0.970287384<br>0.9693132<br>0.965416464<br>0.96444228<br>0.964198734<br>0.963711642<br>0.961032635<br>0.960789089<br>0.959571359<br>0.95518753<br>0.943984413 | 30℃ | 0.964247254<br>0.954770622<br>0.951109197 | 1.006088651<br>0.997808086<br>0.990014613 |
| 31℃ | 0.954986 | 0.960545543 | 31℃ | 0.954986 | 0.960545543 |

OPTIMAL OPERATION CONTROLLER OF PLANT

BACKGROUND OF THE INVENTION

1. Field of the Invention

The present invention relates to an optimal operation controller of a power generation plant, etc., and in particular, an optimal operation controller of a plant for operating plural devices which configure the plant by predetermined values so as to optimize the operation of the entire plant.

2. Description of the Related Art

Conventionally, in an optimal operation controller of a plant for a predicted load, efficiency of each constructing device varies according to an operation output of the constructing device, so that it is impossible to obtain an optimal solution for the optimal operation of each constructing device at once.

In order to solve this inconvenience, in a conventional optimal operation controller obtains the optimal solution by repeatedly performing computations for the optimal solution using a linear planning method.

Figure 9:
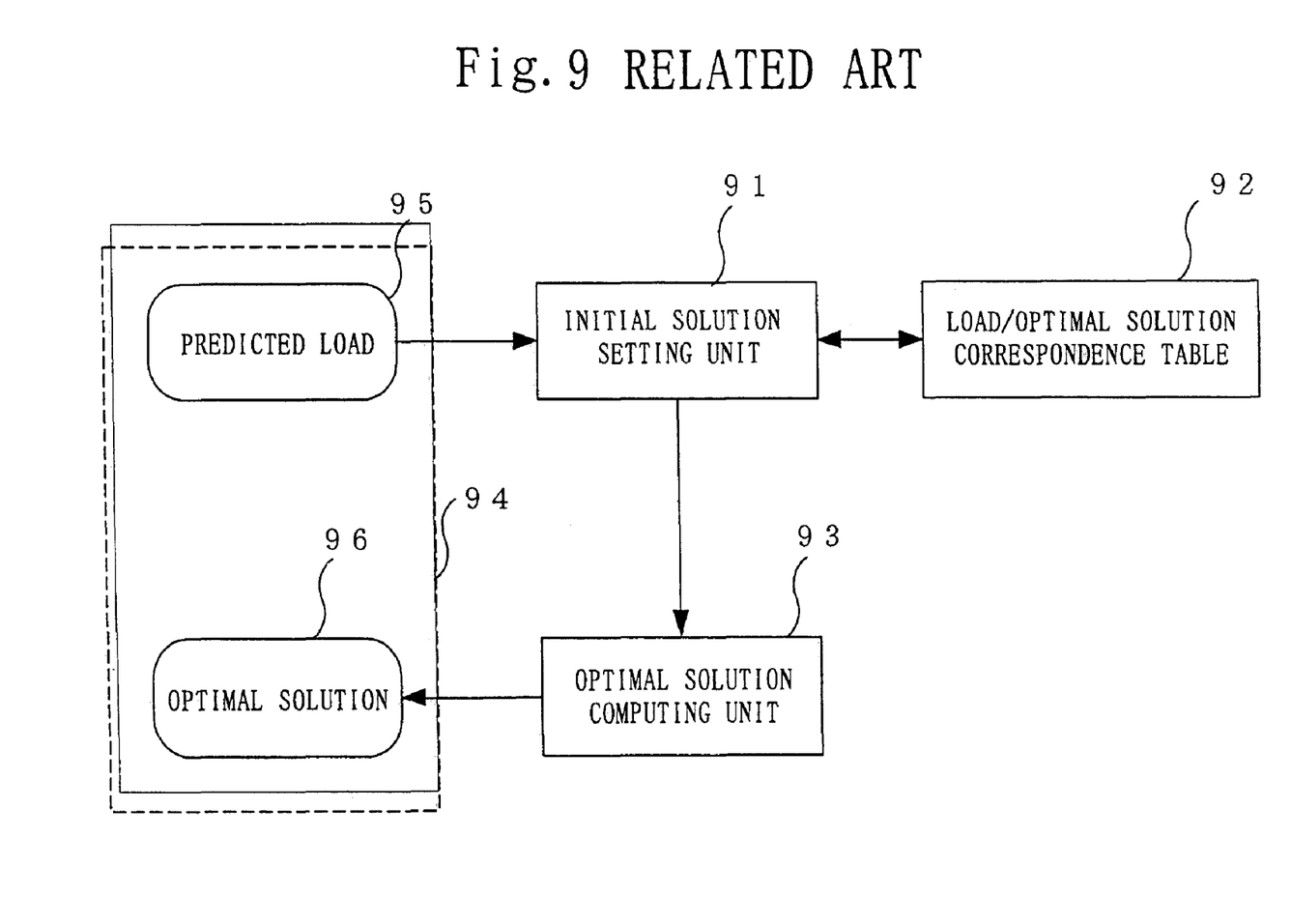
FIG. 9 shows a configuration of a conventional scheduling apparatus for optimal operation.

FIG. 9 shows, for example, a conventional scheduling apparatus for optimal operation disclosed in the Japanese Unexamined Patent Publication No. 5-100712, which includes an optimal solution computing unit 93 for obtaining a computed result of an optimal solution of the operation for each constructing device of the plant, a load/optimal solution correspondence table 92 for storing a correspondence between a load and the optimal solution, and an initial solution setting unit 91.

The optimal solution computing unit of the scheduling apparatus computes efficiency of each constructing device based on an operational amount-efficiency feature curve, and obtains the optimal solution of the operational amount by a linear planning method based on the load and the computed device efficiency. If the obtained result equals an initial solution of the operational amount, this is assumed the optimal solution; if does not equal, the newly computed operational amount is set as an initial value, and the above step is repeated to obtain the optimal solution. Further, the scheduling apparatus has a means to set the initial value by referring to the load/optimal solution correspondence table which accumulates the past computation results to minimize the number of computations, and compute the optimal solution at a high speed.

The optimal solution computing method in the conventional controller for the optimal operation of the plant is formed as described above, which is an analyzing method based on a control model and a device designed value. Accordingly, there is a problem that the computed result does not always show the optimal operation status of an actual plant, since important parameters other than processing data such as locating condition and weather condition of the power generation plant are not considered.

The present invention is made to solve the above problem and aims to obtain a controller for the operation of a plant with the optimal efficiency by considering various conditions which effect efficiency of the actual plant and learning the optimal controlling value based on the past operation data of the plant.

SUMMARY OF THE INVENTION

According to the present invention, an optimal operation controller of a plant includes:

a correlation analyzing unit for obtaining correlation between a state of predetermined process and each element based on an operation status of the plant to be controlled, storing the correlation in a correlation table, and computing operation efficiency for the each element based on the operation status of the plant;

a categorization efficiency table for storing the operation efficiency of the predetermined process computed by the correlation analyzing unit; and an optimal pattern searching unit for referring to the categorization efficiency table based on a data input from the plant and outputting an instruction to control the each element.

In the optimal operation controller of the invention,
the categorization efficiency table stores the operation efficiency for an element and the operation efficiency of an entire plant, and
the optimal pattern searching unit controls the each element in consideration of the operation efficiency of the entire plant.

In the optimal operation controller of the invention, the correlation analyzing unit categorizes the correlation between the state of the predetermined process and the each element into specific steps based on the data input from the plant to be controlled and writes the correlation in the correlation table.

In the optimal operation controller of the invention, wherein
the categorization efficiency table stores an approximated curve generated by the categorized correlation, and
the optimal pattern searching unit outputs the instruction by referring to the approximated curve.

According to another aspect of the invention, an optimal operation controlling method of a plant, includes:
a correlation analyzing for obtaining correlation between a state of predetermined process and each element based on an operation status of the plant to be controlled,
a storing the correlation obtained by the correlation analyzing step into a correlation table,
an efficiency computing for the each element based on the operation status of the plant,
a storing the operation efficiency of the predetermined process obtained by the efficiency computing step into a categorization efficiency table, and
an optimal pattern searching for outputting an instruction to each element by referring to the correlation table and the categorization efficiency table.

BRIEF EXPLANATION OF THE DRAWINGS

A complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Embodiment 1

A configuration and operation of an optimal operation controller of a plant will be explained, which indicates an optimal operation point and controls each constructing element based on the past operation data and/or the past recorded effect to the operation efficiency for each constructing element of the controller of the plant.

Figure 1:
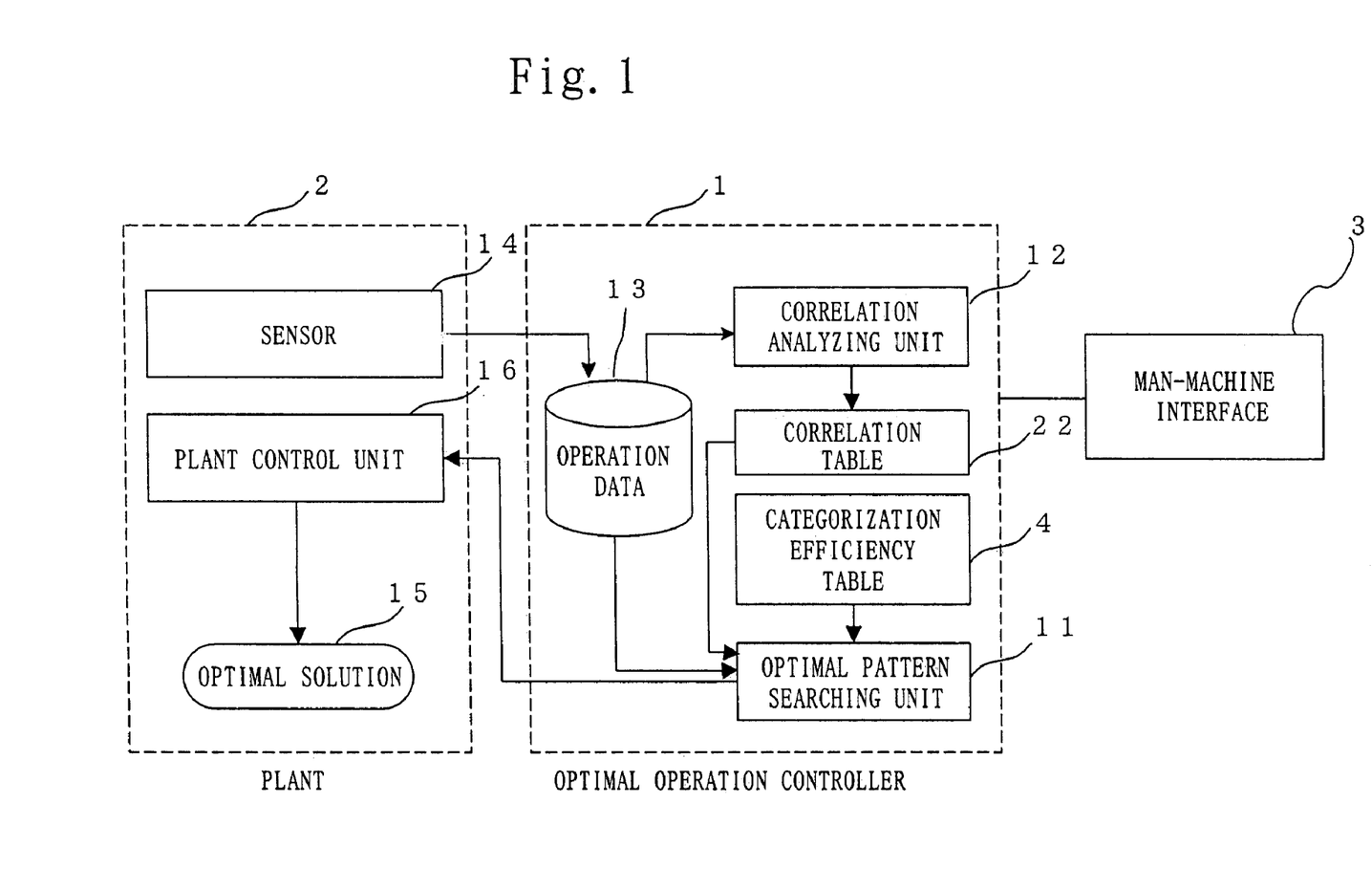
FIG. 1 shows a configuration of an optimal operation controller of a plant according to the first embodiment of the present invention.

FIG. 1 shows a general configuration of the optimal operation controller of the plant according to the first embodiment of the present invention. In the figure, a reference numeral 2 denotes a plant to be controlled, in which 14 shows a sensor placed in the plant 2 for detecting and outputting the operation status of the plant 2. Similarly, 16 denotes a plant controlling unit controlled by a control instruction output, which will be discussed later. As a result of the control, the operation of the plant 2 can be kept with a status of an optimal solution 15. Further, 1 denotes an optimal operation controller, in which 13 denotes an operation database for storing the past operation data for each constructing element corresponding to data input from the sensor. 12 shows a correlation analyzing unit for obtaining correlation coefficient between a certain variable and an element based on the data input from the operation database 13 and the sensor 14, and 22 shows a correlation table for storing correlation coefficient of each constructing element obtained by the correlation analyzing unit 12. 4 denotes a categorization efficiency table for storing working efficiency of the constructing element for each variable, and 11 denotes an optimal pattern searching unit which inputs the data from the sensor 14, refers to the correlation table 22 and the categorization efficiency table 4, searches a point at which efficiency of the plant/system becomes a predetermined value using a statistical method, and outputs a control instruction to the plant controlling unit 16.

A reference numeral 3 shows a man-machine interface, which, for example, inputs power generation amount, condition setting, etc. for a power generation plant, or specifies and inputs an operation condition of an element for which the correlation value is hard to obtain.

The following explains the operation of the optimal operation controller having the above configuration.

The operation can be roughly separated into two: the obtainment of correlation coefficients and the search for an optimal pattern, which follows the obtainment of correlation coefficients. First, an analyzing operation of correlation coefficient will be discussed.

Figure 2:
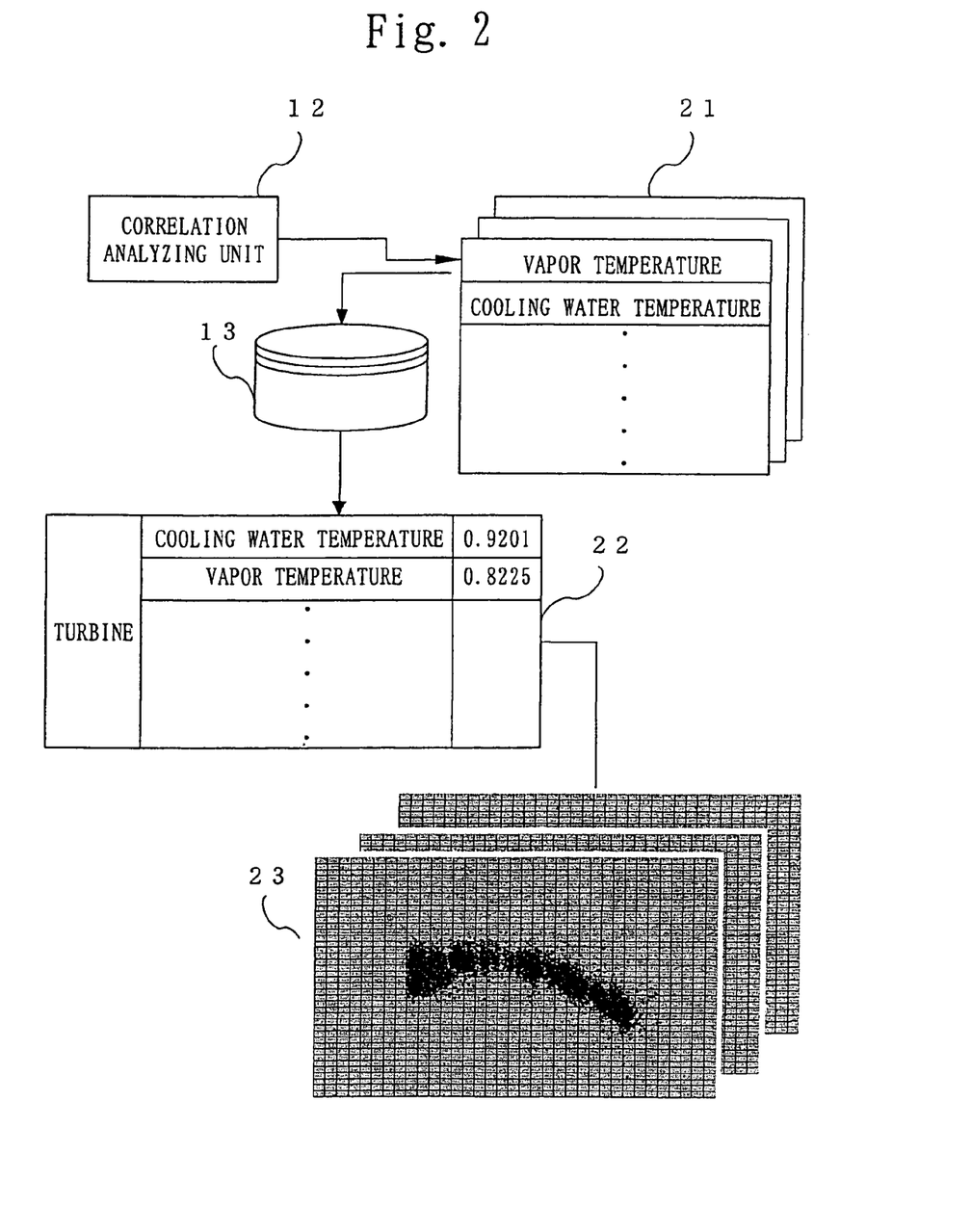
FIG. 2 explains an operation of a correlation analyzing unit according to the first embodiment.

FIG. 2 explains the operation; the correlation coefficient is computed based on the processing data table 21 which collects relevant data from the operation database. For example, the efficiency is obtained for a turbine and written in the correlation table 22. In other words, the correlation analyzing unit 12 analyzes the operation data of the marked element and adjacent elements to the marked element when the plant is in operation and a change occurs. For example, if the turbine is one of the elements, the amount of vapor supplied to the turbine and the temperature of the vapor, the cooling water temperature, the number of rotation of the output side, or the torque are observed and each correlation value of the turbine is analyzed.

Upon analyzing, the computation of efficiency can be obtained first from the relation between an input and an output and effecting parameters based on a control model for each element of the current plant, and then the parameter values of an input/output relational equation of the control model and the relation equation are modified by regression analysis from a few pieces of data of which the degree of effect is large. Namely, the relation between efficiency for each element and the important data value which effects the efficiency is always obtained based on the input/output relational equation modified from the control model by acquiring the operation status of the current plant. This operation is performed by the correlation analyzing unit 12 shown in FIG. 2. Accordingly, the operation database 13 stores not only a simple correlation coefficient but also the modified input/output relational equation.

Figure 3A:
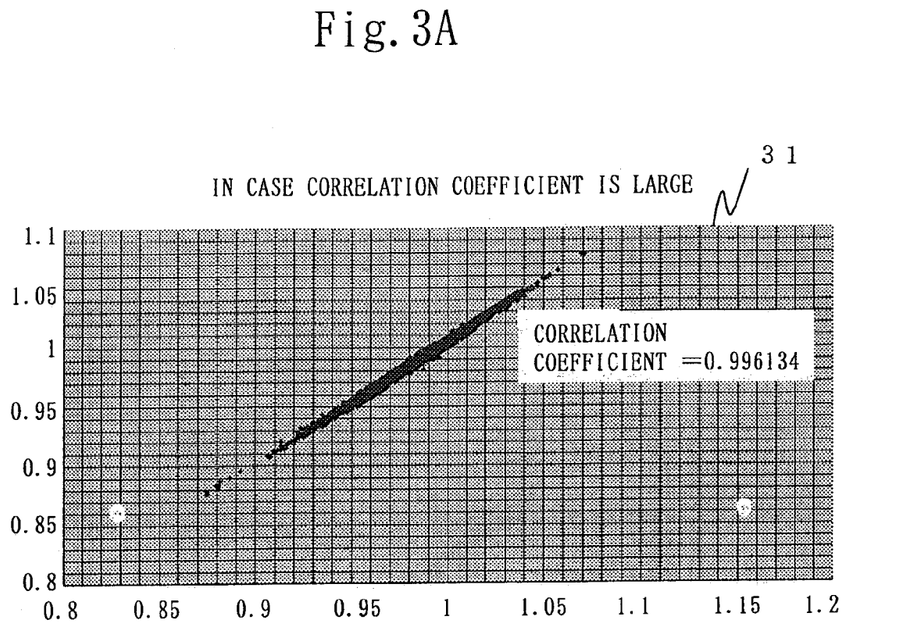
FIGS. 3A and 3B explain strength/weakness of the correlation.
Figure 3B:
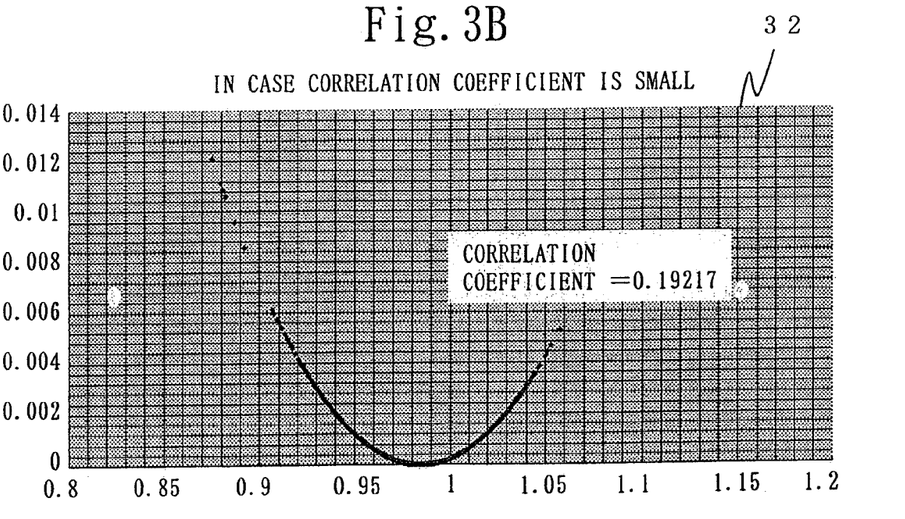

The correlation values are obtained as shown in FIGS. 3A and 3B; if the correlation coefficient is high, the distribution becomes a distribution diagram 31 of FIG. 3A, and if the correlation coefficient is low, the distribution becomes a distribution diagram 32 of FIG. 3B. Therefore, the correlation analyzing unit 12 makes pairs of the name of element and the name of variable from the distribution diagram 31, which is a result of cased of high correlation, and stores the pairs in the descending order of the correlation values in the correlation table 22. The correlation coefficient of this case can be given by the following equation (1); in the equation (1), y and x respectively show a variable of a vertical axis and a variable of a horizontal axis of FIG. 3A, and i shows the i-th variable and a bar shows a mean value.

In this case, for the elements of which the correlation is low, the correspondence between the variable and the element is set by the man-machine interface 3.

$$\rho = \frac{\sum (y_i - \bar{y})(x_i - \bar{x})}{\sqrt{\sum (y_i - \bar{y})^2} \cdot \sqrt{\sum (x_i - \bar{x})^2}} \quad (1)$$

In the equation (1), an absolute value of the correlation coefficient is 1 at maximum; the higher the correlation becomes, the nearer the absolute value closes to 1. However, it is possible to measure the strength of linear correlation by the correlation coefficient, but the correlation cannot be measured in case of, for example, the relation of a quadratic function.

Figure 4:
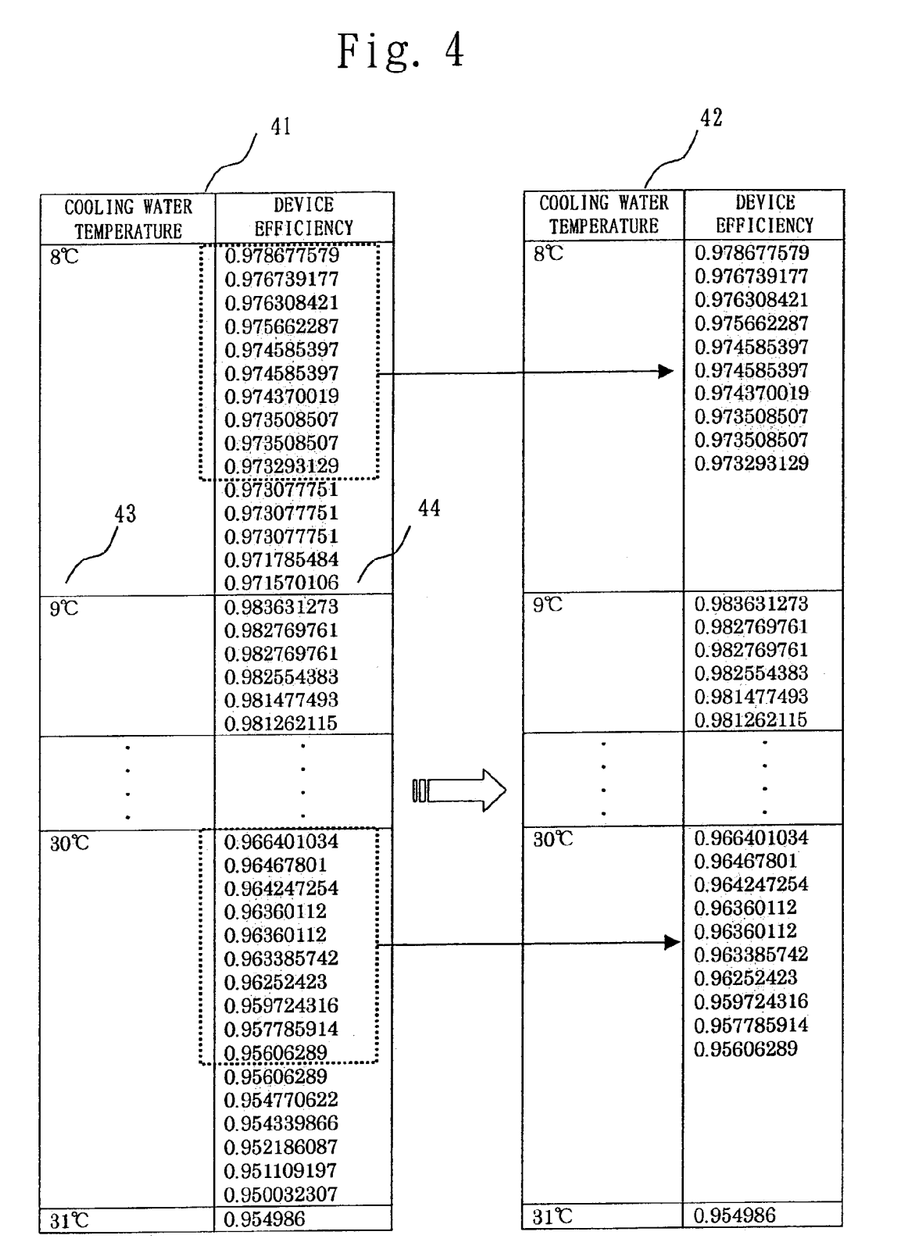
FIG. 4 explains creation of a table showing device efficiencies according to the first embodiment.
Figure 5A:
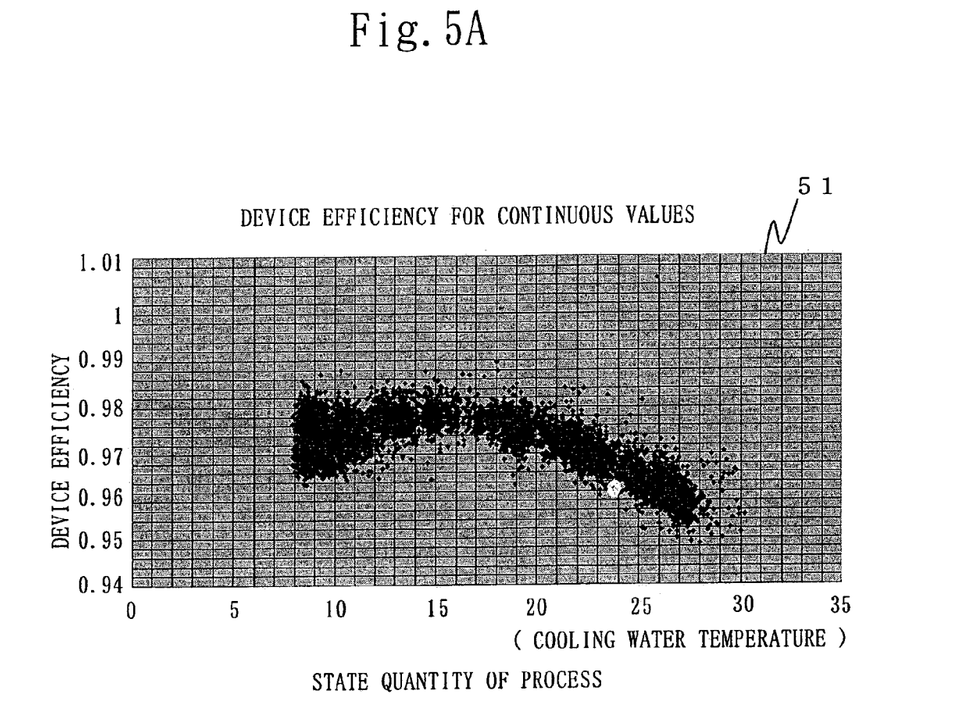
FIGS. 5A and 5B show diagrams showing the device efficiencies for parameters according to the first embodiment.
Figure 5B:
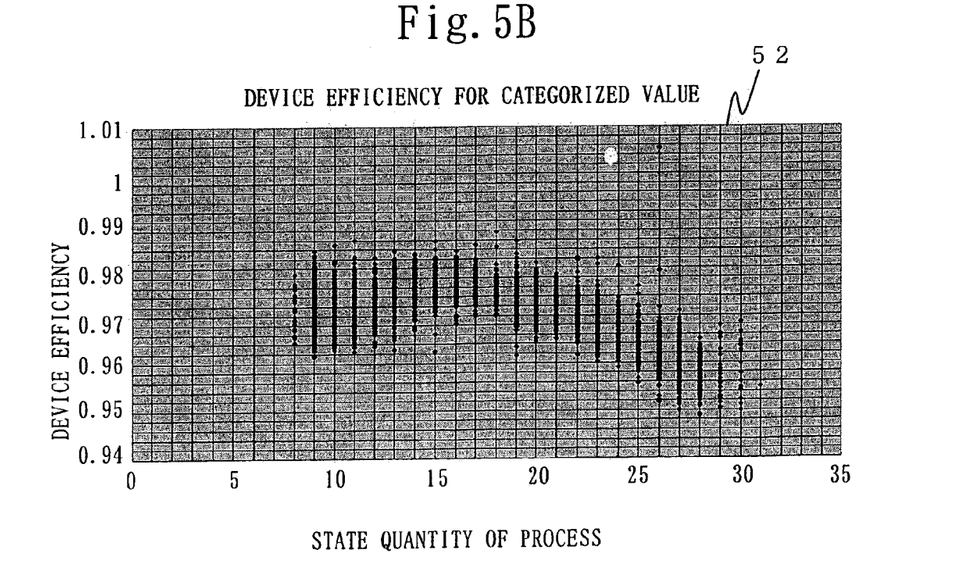

At the same time, the correlation analyzing unit 12 generates an efficiency table. FIG. 4 explains the operation; data of operation efficiency is gathered by following the operation status of the plant time-sequentially, and a distribution table 41 is generated. In this case, the efficiency table for the device efficiency of the elements shown in FIG. 4 or 5, for example, the turbine is generated, and the generated efficiency table is stored in a distribution table 41, which is one of categorization efficiency tables 4.

Figure 8A:
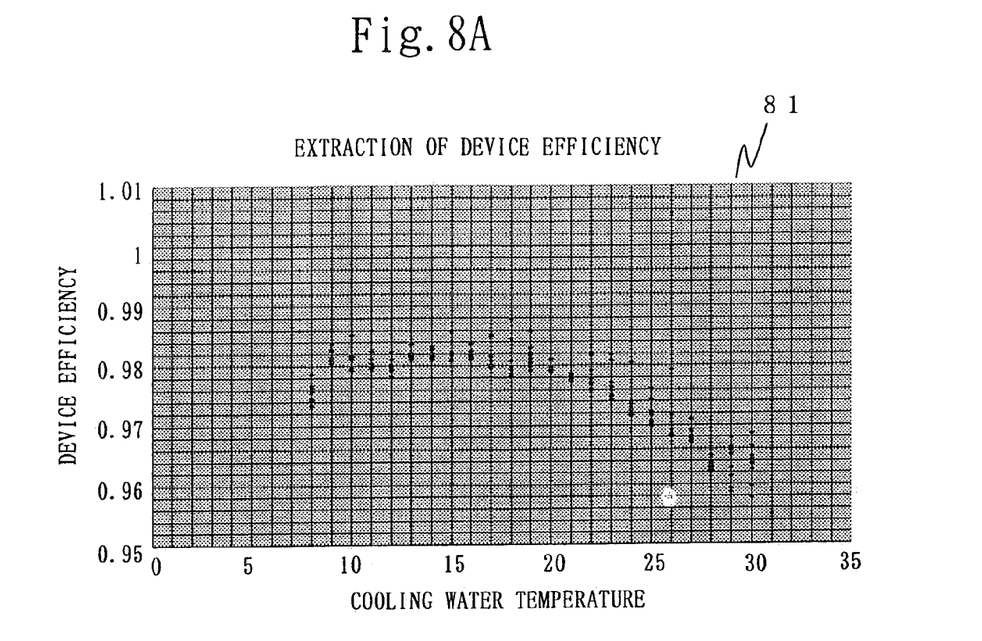
FIGS. 8A and 8B show diagrams showing categorized device efficiencies for parameters.
Figure 8B:
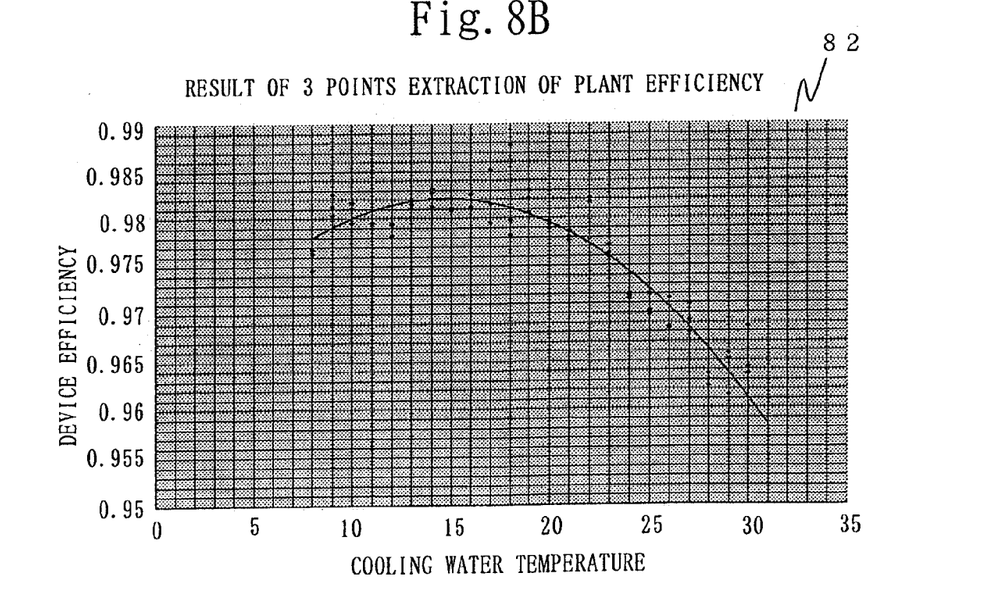

Although in FIG. 5, efficiency data 51 stores plenty of time-sequential data, it is more convenient to store less amount of efficiency data for performing the optimal control. Accordingly, the sampling points are further categorized into specific steps, for example, into one degree of the temperature, and further an output indicating instruction is set into 10 steps, for example, in descending order of the efficiency as shown in FIG. 8. Thus a categorization distribution table 42 is generated. Such categorization of the temperature and the number of the output instructions vary according to the process, so that these pieces of data can be input from the man-machine interface 3, etc.

Figure 6:
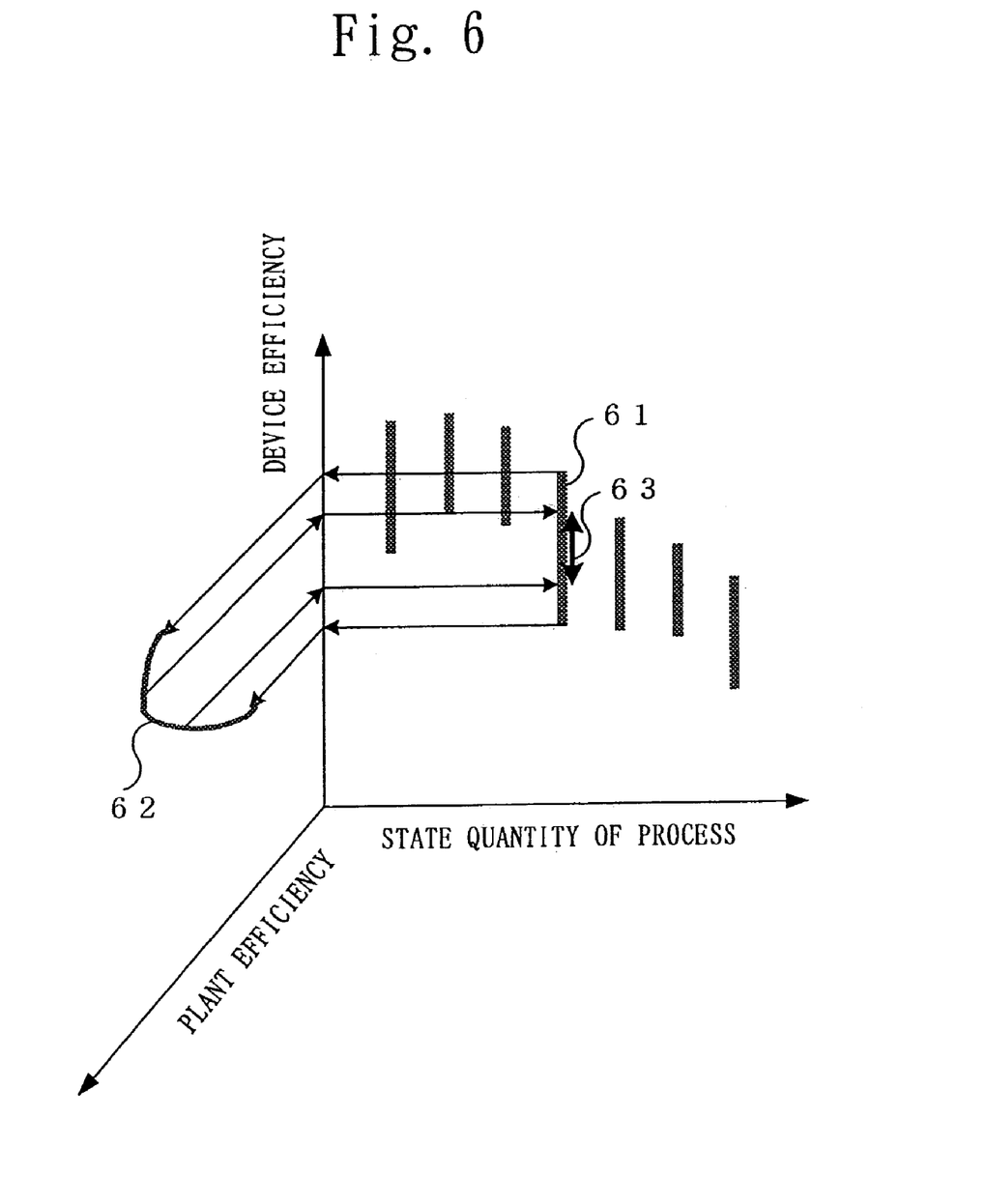
FIG. 6 shows a relationship between the device efficiency and efficiency of the entire plant according to the first embodiment.

The high-ranked point of the device efficiency extracted in the above method is the optimal efficiency for the targeted device; however, it does not always match the efficiency of the entire plant. FIG. 6 shows relation between state quantity of a certain process (variable) and certain device efficiency, and further shows a relation with the efficiency of the entire plant. Among the device efficiencies for the state quantity of the categorized processes obtained by the above setting into limited units, device efficiency 61 for state quantity of a certain process is noted in order to simplify the explanation. Upon observing the relation between the device efficiency 61 and its corresponding power generation plant efficiency 62, the power generation plant efficiency 62 reaches the highest point around the intermediate value rather than the highest point of the device efficiency 61. In this case, the optimal device efficiency should not be selected from the highest points of the device efficiency 61, but it is reasonable to select some points from the highest point of the power generation plant efficiency in consideration of the relation between the device efficiency 61 and the plant efficiency 62, and the corresponding device efficiency 63 is assumed as the optimal operation pattern. This device efficiency 63 is thus selected as the optimal operation pattern of the device efficiency for state quantity of a certain process. The above procedure should be performed for state quantity of all processes.

Figure 7:
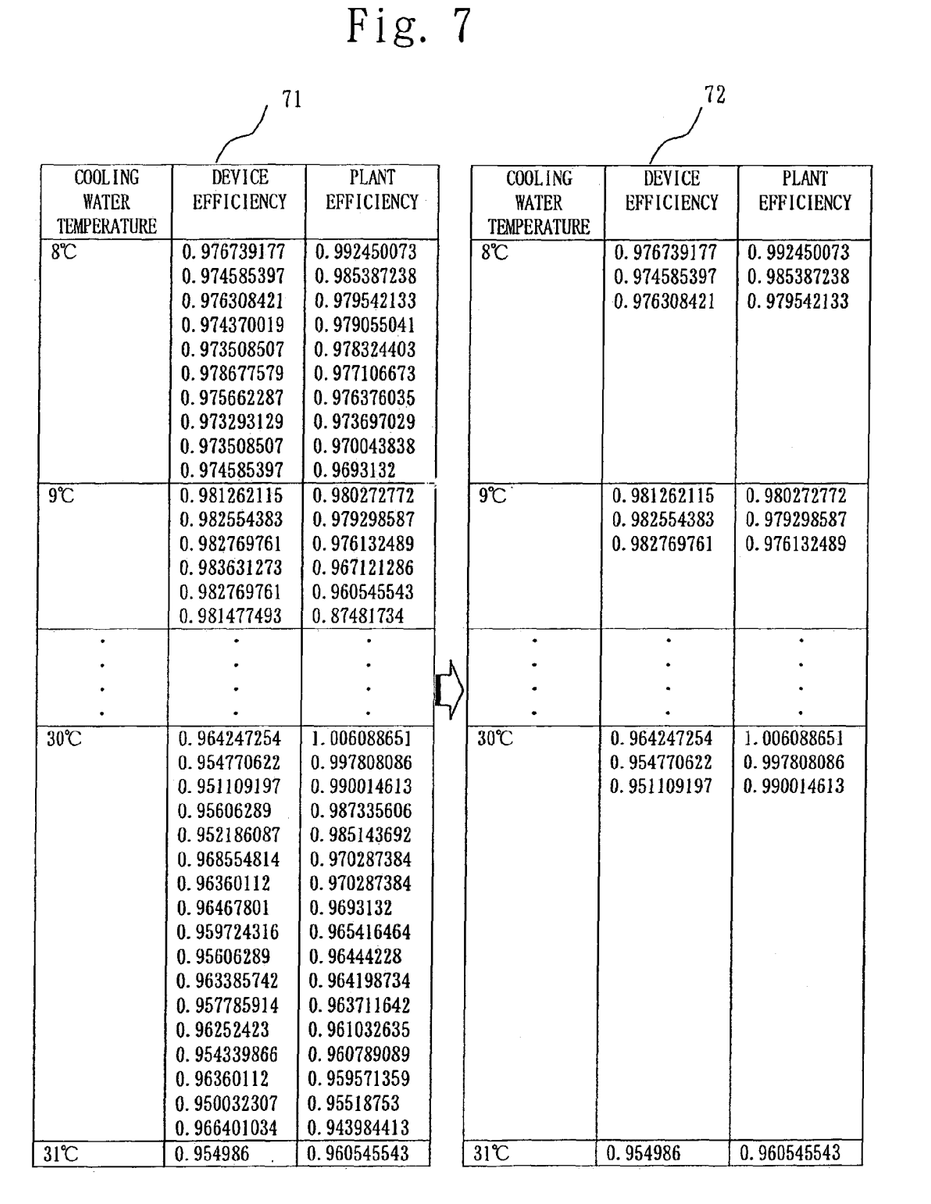
FIG. 7 explains another categorization of efficiencies according to the first embodiment.

A distribution table 71 shown in FIG. 7 is a table in which the efficiencies of the power generation plant are sorted in descending order for each category of the state quantity of process from the distribution table 42 shown in FIG. 4. A distribution table 72 can be generated by extracting some points (three points in FIG. 7) from the highest points of the efficiencies of the power generation plant for each category of the distribution table 71.

FIG. 8A is a distribution diagram 81 showing the device efficiency for the state quantity of 10 processes, which are extracted out of the device efficiencies of FIG. 7 from the highest, and a distribution diagram 82 showing the efficiency of the power generation plant of 3 processes, which are extracted out of the plant efficiencies of the distribution diagram 81 from the highest. Further, a curve 83 is an approximated curve generated by approximating each point of the graph 82 with the least-square method. A function of this approximated curve is an optimization function of efficiency of the power generation plant.

Next, a search operation for an optimal pattern will be discussed.

In FIG. 1, the operation status of the plant 2 is monitored by the sensor 14 and input to the operation database 13. Then, as explained above, the correlation analyzing unit 12 analyzes the operation data as the operation efficiency or the correlation coefficient for a predetermined variable for each operation element, and the analyzed result is stored in the correlation table 22 And the categorization efficiency table 4.

With this condition, the optimal pattern searching unit 11 refers to the categorization efficiency table 4 and outputs a control instruction for the operation elements to be input to the plant controlling unit 16 so as to become the optimal efficiency. For the operation elements specified in the categorization efficiency table 4, such control instruction can be immediately output only by referring to the table, so that there is no need for simulation or computation, which have been required conventionally, before outputting the control instruction.

Further, for the operation elements of which the correlation coefficient with a certain variable has been already computed, once the optimal value of the variable is obtained, the control instruction can be immediately output. As described, the relation for the operation elements without stable correlation coefficient has been previously specified by the man-machine interface 3; that is, a proper control instruction can be output without delay also for the operation elements without stable correlation coefficient.

The optimal pattern searching unit 11 computes the optimal solution 15 based on the current condition such as the temperature, the sea water temperature, the wind velocity, and the plant controlling unit 16 controls the device based on the computed optimal solution, which enables to optimally control the operation status of the power generation plant.

As discussed above, the optimal operation pattern searching method of the present invention is effective as a method for improving the efficiency of plural parameters without having a linear relation such as the efficiency of the device and the efficiency of the entire plant. Further, the present invention eliminates repeated computation, which has been conventionally required, so that a high speed computation of the optimal solution can be performed, which is effective to the system that requires a real-time control.

As has been described, according to the present invention, the optimal operation controller of the plant defines the operation efficiency of the entire plant from the operation efficiency of each constructing element of the operation or the correlation value based on the past accumulated data, and the operation of the plant is controlled by adjusting each constructing element so as to be the defined operation efficiency. And thus the simulation can be eliminated prior to the actual operation, which enables to immediately obtain the optimal control that adapts to the surrounding environmental conditions.

Embodiment 2

In a water conveyance system conveying water to plural pump stations, it is necessary to control a water conveyance plant in consideration of two parameters without having linear relation between them: one is a parameter to stabilize a water level; the other to reduce a cost for electricity as possible. The present invention can be applied to this case; namely, an optimal operation pattern can be selected as a case in which the cost for electricity could be kept low from the past operation data in which the water was conveyed with a stabilized water level. And thus the optimal operation control is enabled with exploiting features of the water conveyance system.

Further, the correlation computation clarifies the relation between each element and variables that affect the efficiency, which enables to control the operation that fits the actual operation status of the entire-plant.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

What is claimed is:

1. An optimal operation controller of a plant comprising:
a correlation analyzing unit for performing regression analysis to obtain a correlation between an operative parameter of a predetermined process and each of a plurality of operation elements based on an operation status of the plant to be controlled, storing the correlation in a correlation table, and computing operation efficiency for each operation element based on the operation status of the plant, wherein said correlation analyzing unit uses data collected from the plant during a prior implementation of the predetermined process to perform the regression analysis and compute the operation efficiencies of the operation elements;
a categorization efficiency table for storing the operation efficiency of each operation element computed by the correlation analyzing unit in association with a highly correlative operative parameter of the predetermined process as determined by the regression analysis, wherein the categorization efficiency table further stores a relationship between the operation efficiency of each operation element and the overall efficiency of the predetermined process determined based on the data collected during the prior implementation; and
an optimal pattern searching unit for performing a look-up of the categorization efficiency table based on data collected from the plant during a subsequent implementation of the predetermined process in order to output an instruction to control each of the operation elements during the subsequent implementation of the predetermined process without simulating or computing an operation efficiency.

2. The optimal operation controller of the plant of claim 1, wherein:
the categorization efficiency table stores the operation efficiency for operation element and the operation efficiency of an entire plant, and
the optimal pattern searching unit controls each operation element in consideration of the operation efficiency of the entire plant.

3. The optimal operation controller of the plant of claim 1, wherein the correlation analyzing unit categorizes the correlation between the state of the predetermined process and each operation element into specific steps based on the data input from the plant to be controlled, and writes the correlation in the correlation table.

4. The optimal operation controller of the plant of claim 3, wherein
the categorization efficiency table stores data of an approximated curve generated by the categorized correlation, and
the optimal pattern searching unit outputs the instruction by referring to the data of the approximated curve.

5. An method of performing optimal operation control of a plant, comprising:
performing regression analysis to obtain a correlation between an operative parameter of a predetermined process and each a plurality of operation elements based on an operation status of the plant to be controlled, wherein the regression analysis is performed using data collected from the plant during a prior implementation of the predetermined process,
storing the correlation obtained by the correlation analyzing step into a correlation table,
computing efficiency for each of the one or more operation elements based on the operation status of the plant, wherein the computing step uses the data collected from the plant during the prior implementation of the predetermined process,
storing, in a categorization efficiency table, the operation efficiency of each operation element obtained by the efficiency computing step and a highly correlative operative parameter of the predetermined process as determined by the regression analysis,
storing, in the categorization efficiency table, a relationship between the operation efficiency of each operation element and the overall efficiency of the predetermined process determined based on the data collected during the prior implementation, and
performing a look-up of the categorization efficiency table based on data collected from the plant during a subsequent implementation of the predetermined process in order to output an instruction to control each of the operation elements during the subsequent implementation of the predetermined process without simulating or computing operation efficiency.

6. The optimal operation controller of claim 5, wherein the plurality of operation elements are devices for configuring the plant during the predetermined process.

7. The method of claim 5, further comprising:
storing the operation efficiency for each operation element and of the entire plant in the categorization efficiency table, and
controlling each operation element in consideration of the operation efficiency of the entire plant.

8. The method of claim 5, further comprising:
categorizing the correlation between the state of the predetermined process and each operation element into specific steps based on the data input from the plant to be controlled, and
writing the correlation in the correlation table.

9. The method of claim 8, further comprising:
storing data of an approximated curve generated by the categorized correlation in the categorization correlation table, and
referring to the data of the approximated curve when performing the look-up of the categorization correlation table in order to output the control instruction.

10. The method of claim 5, wherein the predetermined process involves the plurality of operation elements.

11. The method of claim 10, wherein the plurality of operation elements are devices for configuring the plant during the predetermined process.

12. A method for controlling devices in a plant in order to optimize the operation of the plant during a process, comprising:
collecting operational data from the plant during a first implementation of the process, the collected operational data relating to operational parameters of the plant and outputs of the devices;
calculating an efficiency value for each of the devices based on the collected operational data;
performing regression analysis to correlate changes in the one or more operational parameters to the calculated efficiency values of the respective devices based on the collected operational data to generate correlation values;
storing the generated correlation values in a correlation table;
storing each of the calculated efficiency values of the devices in a look-up table in association with a highly correlative operating parameter of the process as determined by the regression analysis;

storing a relationship between each of the calculated efficiency values of the devices and an overall efficiency of the process in the look-up table, the relationship being determined based on the collected operational data; and referring to the look-up table in order to output a control instruction to each of the devices during a second implementation of the process without simulating or computing efficiency, wherein the second implantation of the process occurs subsequent to the first implementation.

13. The method of claim 12, wherein the generated correlation values are stored in the look-up table in response to determining that an operational parameter has a strong effect on efficiency of at least one of the devices based on the regression analysis being performed on the generated correlation values, and the generated correlation values are stored in the look-up table in response to the determination of the strong effect.

14. The method of claim 13, wherein the collected operational data includes a plurality of variables related to the operation of the plant during the process, and the correlating step includes calculating a correlation coefficient for each of the variables according to the performed regression analysis, the one or more operational parameters being selected from the variables on the basis of the correlation coefficients.

15. The method of claim 12, wherein the collected operational data is continuously sampled as an output quantity of the process changes, the method further comprising:

categorizing the sampling points of the collected operational data into a number of specific steps corresponding to a number of instructions for specifying an output quantity of the process.

16. The method of claim 12, wherein the correlating step determines a relationship between efficiency of at least one of the devices and efficiency of the entire plant, the control instruction being output to the at least one of the devices based on the determined relationship.

17. The method of claim 16, wherein the control instructions are output to the plurality of devices in order to maximize the efficiency of the entire plant.

18. The method of claim 12, wherein the method is performed for a water conveyance system to optimize conveyance of water to a plurality of pump stations.

* * * * *